United States Patent [19]

Christianson et al.

[11] Patent Number: 5,322,098
[45] Date of Patent: Jun. 21, 1994

[54] APPARATUS AND METHOD FOR CONVEYANCE OF FLOWABLE SOLID MATERIALS

[75] Inventors: Roy O. Christianson, Blomkest; Lee O. Christianson, Wilmar; Roland Rauenhorst, Olivia, all of Minn.

[73] Assignee: Christianson Systems, Inc., Blomkest, Minn.

[21] Appl. No.: 19,157

[22] Filed: Mar. 3, 1993

Related U.S. Application Data

[63] Continuation-in-part of Ser. No. 850,564, Mar. 13, 1992.

[51] Int. Cl.⁵ .............................................. B67C 3/26
[52] U.S. Cl. ........................................ 141/279; 141/93
[58] Field of Search ................ 141/1, 387, 279, 93; 137/615

[56] References Cited

U.S. PATENT DOCUMENTS

| | | | |
|---|---|---|---|
| Re. 24,916 | 12/1960 | Oliver | 406/67 |
| D. 271,105 | 10/1983 | Christianson et al. | 406/43 |
| 2,230,425 | 2/1941 | Finnegan | 406/65 |
| 2,622,341 | 12/1952 | Finnegan | 406/109 |
| 2,683,063 | 7/1954 | Malachick | 406/93 |
| 2,708,489 | 5/1955 | Stokoe | 406/39 |
| 2,837,377 | 6/1958 | Finnegan | 406/105 |
| 2,946,626 | 7/1960 | Atkinson et al. | 406/67 |
| 3,129,980 | 4/1964 | Kiesbar et al. | 406/65 |
| 3,155,431 | 11/1964 | Baldwin | 406/39 |
| 3,207,560 | 9/1965 | Brown | 406/120 |
| 3,210,127 | 10/1965 | Schaben et al. | 406/65 |
| 3,219,394 | 11/1965 | Moss et al. | 406/171 |
| 3,318,473 | 5/1967 | Jones et al. | 414/608 |
| 3,372,725 | 3/1968 | Voorhees | 137/585 |
| 3,384,106 | 5/1968 | Isbrandtsen | 137/269 |
| 3,460,718 | 8/1969 | Plant | 222/143 |
| 3,583,910 | 6/1971 | Stoddard | 210/713 |
| 3,827,578 | 8/1974 | Hough | 406/786 |
| 3,876,260 | 4/1975 | Moss et al. | 406/29 |
| 3,953,077 | 4/1976 | Kulyabko et al. | 406/23 |
| 3,955,236 | 5/1976 | Mekelburg | 15/314 |
| 4,016,994 | 4/1977 | Wurster | 406/39 |
| 4,095,625 | 6/1978 | Marpe | 141/93 |
| 4,100,720 | 7/1978 | Carnewal et al. | 56/14.6 |
| 4,186,841 | 2/1980 | Buckley et al. | 220/6 |

(List continued on next page.)

FOREIGN PATENT DOCUMENTS 489541 1/1930 Fed. Rep. of Germany.
2633593 1/1990 France.

(List continued on next page.)

OTHER PUBLICATIONS

Christianson Systems, Inc., *Brochure for Pneumatic Conveying Seed Filler TM system*, 2 pages, 1991.
Christianson Systems, Inc., *Brochure for Pneumatic Conveying Seed Filler TM System*, 5 pages, 1991.
*Total Concept in Bulkhandling and Process Control*, published at least as early as Aug. 12, 1991 by tbma europe bv.

(List continued on next page.)

Primary Examiner—Henry J. Recla
Assistant Examiner—David J. Walczak
Attorney, Agent, or Firm—Merchant, Gould, Smith, Edell, Welter & Schmidt

[57] ABSTRACT

A transfer system for flowable solids or particulates is described. The transfer system includes an air seal assembly having an upstream side and a downstream side. The air seal assembly is constructed such that an air pressure differential can be maintained between the opposite sides thereof, but particulate material can be transferred through the air seal assembly. The transferring system includes an arrangement for transporting flowable solid material to the upstream side of the air seal assembly, the transfer taking place within a moving airstream at a pressure of less than ambient. Also, the system includes an arrangement for transporting the flowable solid material from the downstream side of the air seal assembly, preferably under gravity influence and ambient pressure. The transfer system includes an articulated arm arrangement on which the air seal assembly is mounted, for convenience.

8 Claims, 11 Drawing Sheets

U.S. PATENT DOCUMENTS

| | | | |
|---|---|---|---|
| 4,394,259 | 7/1983 | Benny et al. | 209/143 |
| 4,433,946 | 2/1984 | Christianson et al. | 406/43 |
| 4,503,786 | 3/1985 | Tautfest | 111/174 |
| 4,572,726 | 2/1986 | Van Abbema | 55/337 |
| 4,580,928 | 4/1986 | Van Abbema | 55/459.1 |
| 4,599,016 | 7/1986 | Medemblik | 406/67 |
| 4,701,080 | 10/1987 | van Aalst | 406/109 |
| 4,718,924 | 1/1988 | DeMarco | 55/302 |
| 4,731,101 | 3/1988 | Kanda | 55/323 |
| 4,793,743 | 12/1988 | Grodecki et al. | 406/123 |
| 4,834,586 | 5/1989 | Depew | 406/18 |
| 4,846,605 | 7/1989 | Christianson et al. | 406/41 |
| 4,846,608 | 7/1989 | Sanders | 406/144 |
| 4,885,012 | 12/1989 | Thompson | 55/290 |
| 4,913,597 | 4/1990 | Christianson et al. | 406/39 |
| 4,966,310 | 10/1990 | Hawkins | 222/105 |
| 4,967,813 | 11/1990 | Ponvianne et al. | 141/128 |
| 5,006,018 | 4/1991 | Depew | 219/99 |
| 5,016,686 | 5/1991 | Gerstenkorn | 141/96 |
| 5,168,906 | 12/1992 | Combrink | 141/10 |

FOREIGN PATENT DOCUMENTS

| | | |
|---|---|---|
| 2643887 | 9/1990 | France . |
| 384761 | 11/1973 | U.S.S.R. . |
| 7552 | of 1910 | United Kingdom . |
| 1293750 | 10/1972 | United Kingdom . |
| 2194208A | 3/1988 | United Kingdom . |
| 2232965A | 1/1991 | United Kingdom . |

OTHER PUBLICATIONS

Copy of Declaration of Lee O. Christianson A. Sales brochure for Metalfab, Inc., Bulk Bag Unloader B. Sales brochure for B.A.G. Equipment Corp., C. Sales brochure for Custom Packaging System, Inc.; Rhino Bulk Bags & Liners.

APPARATUS AND METHOD FOR CONVEYANCE OF FLOWABLE SOLID MATERIALS

CROSS-REFERENCE TO RELATED APPLICATION

The present application is a continuation-in-part of application Ser. No. 07/850,564, filed Mar. 13, 1992. The disclosure of Ser. No. 07/850,564 is incorporated herein by reference.

FIELD OF THE INVENTION

The present invention relates to systems for transferring cargo. In general, the invention concerns systems for transferring flowable solid material. Specifically, in the preferred applications the invention concerns an apparatus and method for transfer of flowable solid material from one container to another.

BACKGROUND OF THE INVENTION

Flowable solid materials (herein "flowable solids", "particulates", or variants thereof) include, inter alia, agricultural grains, fertilizers, herbicides, pesticides, and synthetics in pellet or granular form. Flowable solids are frequently handled in bulk; and, consequently, specialized technologies are needed for transporting, storing, and transferring them.

Consumers of flowable solid materials in agriculture and industry frequently need to transfer flowable solids from one container to another. As an example, agricultural grain sometimes needs to be transferred quickly and efficiently from a truck to a storage bin; or from a storage bin to a truck, etc.

Conventional methods of transporting and transferring flowable solids have been less than fully acceptable. One conventional method involves both transporting and transferring flowable solid material in barrels. Handling barrels is quite difficult and loss of flowable solid material during transfer may occur when barrels are used. This is due to their size, shape, and weight. Conventional barrels are quite heavy and have large openings at their top. When transferring material from a barrel to another container spillage may occur or dust (airborne) may be generated.

Another problem with barrels is that they take up as much room empty as they do when full. Shippers may want to reuse barrels. They would therefore have the barrels returned when empty. However, the large volume occupied by empty barrels would create undesirable shipping expense One alternative solution, destruction of the barrels after a single use, solves the problem of wasted storage and shipping space, but wastes the resources represented by the empty barrels.

Another conventional method of transferring flowable solids uses flexible sacks holding about 100 pounds of material. There are a number of problems associated with use of these sacks. In particular, the sacks are subject to breakage during shipping, thus leading to spillage and loss of product. In addition, large shipments require a large number of sacks, each of which must be filled, transported and stacked. Also, loss of material or dust generation may accompany transfer of the flowable solids from the sacks to a container. In addition the lack of automation in this conventional method inhibits transfer from one closed container to another closed container.

SUMMARY OF THE DISCLOSURE OF FIGS. 1-6

FIGS. 1-6, and principles relating thereto, were disclosed in U.S. application Ser. No. 07/850,564. According to Ser. No. 07/850,564, a transfer system is provided for moving flowable solids. Generally, the transfer system is used to move flowable solids such as particulates from a first receptacle or location to a second receptacle or location. For example, there may be transfer from a storage container to the holder of a farm distributor, as would be done for pesticides, herbicides or seed materials.

Transfer systems according to FIGS. 1-6 generally include an air seal (airlock) assembly. The air seal assembly has an upstream side and a downstream side. The air seal assembly generally includes means for maintaining an air pressure differential between the upstream and downstream sides thereof It also includes means for transporting the flow of solid material between the upstream side and the downstream side, while still maintaining the air pressure differential. Preferably, this is conducted through utilization of a rotary air seal as the air seal assembly. Air transfer systems according to FIGS. 1-6 also include means for transporting flowable solid material to the upstream side of the air seal assembly, while conveying the solid flowable material within an airflow stream having an air pressure less than ambient. That is, in general, a vacuum draw is used to draw the particulate material from the first location and transfer it to the upstream side of the air seal assembly. In this manner, the particulate material, while contained within the airstream, is generally under conditions of a pressure less than ambient. Should a leak develop in the system containing the airflow with the particulate material suspended therein, escape of the particulate material to the ambient is unlikely. Rather, what will occur at the leak is that ambient air will be drawn into the airflow. This operation under "negative" pressure (pressure less than ambient) is highly advantageous, especially when a transfer concerns hazardous material.

Preferred transfer systems also include means for transporting flowable solid material from the downstream side of the air seal assembly, to a selected remote location. Preferably, this comprises means for transferring the particulate material under about ambient pressure and gravity influence. The arrangement may comprise a telescoping tube assembly with means for collecting particulate material at the downstream side of the air seal assembly and for directing passage of the particulate material to a selected location.

In certain applications, the telescoping tube assembly, which defines an internal solids flow passageway, includes means thereon for selectively closing the internal solids flow passageway. In one embodiment described and shown, a butterfly valve controllable by an operator is provided. When closed, the valve can be utilized to inhibit undesired spillage of material from the inside of the telescoping tube assembly.

In certain applications, detection means are provided for detecting an amount of flowable material discharged from the telescoping tube assembly. In addition, means for stopping flow of flowable solids to the air seal assembly upstream side, in automatic response to a selected amount of discharged material detected by the detection means, is provided. This allows for an automatic shut-off of transfer of material by the transfer system, if desired.

In certain applications, the means for transporting flowable solid material to the upstream side of the air seal assembly comprises a vacuum and separator construction including means for selectively collecting flowable solid material into a moving airstream and transporting same; and, means for selectively and continuously separating transported solid particulate material from the moving airstream and depositing the separated solids particulate material at the air seal assembly upstream side. Preferably separation is conducted through utilization of a cyclone separator arrangement.

For certain applications, a vacuum adapter is provided, as an intake for particulate material. The vacuum adapter may comprise a rigid tubular member having an air bleed arrangement or hole therein. Preferably, a gate is provided to allow selected control of the size of the air bleed.

In certain arrangements, the vacuum tube arrangement includes at least a section of flexible hose associated therewith. Also, it may include at least a pair of rigid tubular sections, one section being radially rotatable (about a common central axis) relative to the other. This, as will be seen from detailed descriptions, provides for flexibility in directing transport of flow of particulate material from one end of the transfer system to another.

Also, a transfer and storage assembly is provided. The assembly includes a transfer system as previously described and a holding receptacle for flowable solid material; the holding receptacle being constructed, arranged, and positioned to receive transported particulate material from the transfer system. Means are provided for sealing the transfer system to the holding receptacle, to obtain transfer from the transfer system into the holding receptacle without generation of dust at the communication interface therebetween. A variety of adapters, conduits, and tubes may be utilized to accomplish this.

In certain systems, the assembly also includes a collapsible, flexible storage bag for flowable solid material in association with an intake to the transfer system. The collapsible, flexible storage bag is provided in sealing engagement to the intake, so that a closed transfer can be effected. Means for accomplishing this are described in detail.

SUMMARY OF THE DISCLOSURE WITH RESPECT TO CLAIMS 7-11

According to the present invention as disclosed in FIGS. 7-11, transfer system for moving flowable solids is provided. The transfer system comprises a support structure including a base frame in an articulated arm arrangement. The articulated arm arrangement includes a first arm extension and a second arm extension, the first extension being pivotally mounted on the base frame for selective pivotal movement with respect thereto; and, the second arm extension is pivotally mounted on the first extension for selective pivotal motion with respect thereto. An air seal assembly is defined herein is supported on the second arm extension, for pivotal movement therewith. That is, as the second arm extension is pivoted, the air seal assembly is also pivoted.

In preferred embodiments, the second arm extension includes a parallelogram linkage arrangement constructing and arranged for selective vertical movement of the air seal assembly. A motion dampener and vertical support member such as a gas charged spring-loaded shock absorber, is utilized in preferred embodiments of the parallelogram linkage system, for controlled movement and support.

As explained hereinbelow in detail, features of the transfer system, especially the air seal (airlock) assembly, for the arrangement shown in FIGS. 7-11 may be generally analogous to features described with respect to FIGS. 1-6, and the parent disclosure.

DETAILED DESCRIPTION OF FIGS. 1-6

Agriculture and industry make use of a variety of flowable solid materials. Flowable solid materials are typically in the form of grains, pellets, seeds, or granules. Common flowable solid materials include fertilizers, herbicides, insecticides, seeds, grains, and synthetic plastic pellets and grander form.

Transporting and transferring flowable solid materials (flowable solids) presents a number of problems. In particular, these problems arise when transporting large bulk shipments from one point to another, and when transferring flowable solid material from shipping containers to other containers for storage or use. One specific problem is loss through spillage of flowable solid material when transferring from a shipping container to a second container. Another problem is the generation of airborne dust, posing a threat to the safety of workers.

In addition, many flowable solid materials such as agricultural herbicides and pesticides are subject to restrictions on use and handling. For example, regulations may require that shipping containers for certain restricted materials be returned to the manufacturer or supplier of the material after the containers are empty. Also, because of the hazardous nature of such materials, it is desirable to provide a system of transferring flowable solid materials from one closed container to another closed container, without generating dangerous dusts in the air. The parent application, Ser. No. 07/850,564, disclosed arrangements for addressing these and related concerns. The arrangements disclosed in Ser. No. 07/850,564 are presented herein as FIGS. 1-6.

Figure 1:
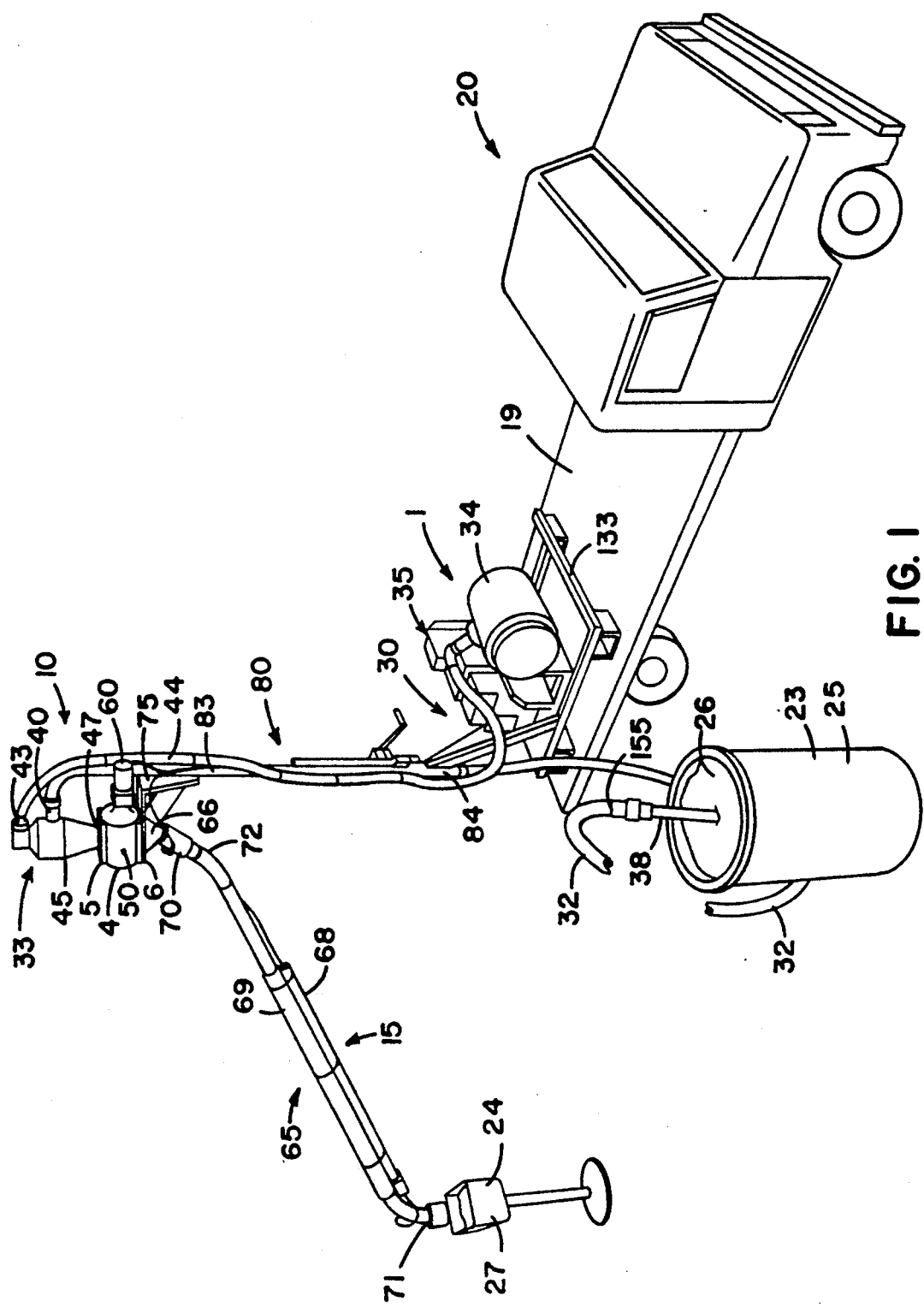
FIG. 1 is a perspective view of a transfer system, according to the disclosure of Ser. No. 07/850,564, depicted loaded on a truck.

The reference numeral 1, FIG. 1, generally indicates a transfer system for moving flowable solids. The transfer system 1 includes an air seal assembly (airlock) 4. The air seal assembly 4 has an upstream side 5 and a downstream side 6. By "upstream" and "downstream" in this context, reference is being made to a flow path of solid particulate material through the air seal assembly 4, in operation. That is, in normal use as flowable solids pass through the air seal assembly 4 they pass from the upstream side 5 to the downstream side 6. The air seal assembly 4 includes means, described below, for maintaining an air pressure differential between the upstream and downstream sides even as flowable solid material is passed therebetween.

Transfer system 1 also includes means for transporting flowable solid material to the upstream side 5 of the air seal assembly 4. This is generally indicated by reference numeral 10. The system 1 further includes means for transporting flowable solid material from the downstream side 6 of the air seal assembly 4 to a selected location. This is generally indicated by reference numeral 15.

In FIG. 1, transfer system 1 is depicted resting on a bed 19 of a truck 20. This is to indicate that transfer systems 1 can be constructed, configured, and sized to be positioned on trucks, carts, rollers, wheels, and the like, for easy transport. A variety of means for transporting transfer system 1 may be utilized, the truck 20 merely providing an example.

In FIG. 1, apparatus 1 is shown depicted for conveying flowable solid material from a first location or container 23 to a second location or container 24. The first container 23 depicted comprises a barrel 25 containing flowable material 26, for example a pesticide. The second container 24 comprises the holding container 27 of a pesticide spreader (not shown). Although the first container 23 depicted comprises a barrel 25, it will be understood that any of a variety of containers, including bags, sacks, bins or the like, may be utilized. Similarly, even though the system 1 is depicted in FIG. 1 being utilized in the field for transfer from a storage container 23 to an implement spreader container 27, a variety of other transfers may be conducted with apparatus 1. It is an advantage, however, that transfer systems 1 can be sized, shaped, and configured for use in the field for typical conveyances that might be needed on farms.

Still referring to FIG. 1, means 10 for transporting flowable solid material to the upstream side 5 of the air seal assembly 4 generally comprises a transport arrangement 30 for transporting particulate material 26 from barrel 23 to air seal assembly 4. Transport arrangement 30 is constructed and arranged to deliver particulate material 26 to the upstream side 5 of air seal assembly 4 in an airflow stream having a pressure of less than ambient. Thus, for a typical transfer system 1, transport arrangement 30 comprises an arrangement for generating a vacuum draw on particulate material 26 and barrel 23. Advantage which results from this will be apparent from further descriptions hereinbelow. By "less than ambient" in this context it is meant that the pressure within the transport arrangement 30, is less than the pressure outside of it (ambient being the environment outside of the transport arrangement 30), when the system 1 is in operation to conduct a transfer.

Transport arrangement 30 comprises intake tube 32, separator arrangement 33, filter arrangement 34, and blower assembly 35. Operation is generally as follows:

Particulates 26 are drawn into intake tube 32 through vacuum adapter 38. The particulates (carried by an air stream) travel through tube 32 and up to inlet 40 of separator arrangement 33. In separator arrangement 33, the particulates 26 are separated from the airflow stream. The airflow stream is drawn off from separator arrangement 33 through outlet 43. The airstream then passes through outlet tube arrangement 44 to filter assembly 34, whereat fine contaminants are removed from the airflow stream, before the air passes through blower assembly 35 and is vented to the atmosphere. The blower assembly 35 generally comprises a blower which: draws air from the ambient (i.e., creates a vacuum draw on intake tube 32); pulls the air through filter arrangement 34 and blows (discharges or exhausts) it into the environment. The blower assembly 35 may comprise a conventional engine/blower system, or any of a variety of alternative systems.

From the above description, it will be apparent that in general the airflow stream inside of intake tube 32 is at a pressure less than ambient, while it is carrying the particulate material to the separator 33. Thus, should a break or puncture form in line 32, generally under the negative pressure relative to the environment air from the environment would flow into the puncture from outside (as opposed to flow of particulate material outwardly from the puncture).

For the embodiment illustrated in FIG. 1, separator arrangement 33 comprises a cyclone separator 45. A conventional such cyclone separator 45 may be utilized. For such an arrangement, separation occurs on a continuous flow through basis, with particulate material continuously separated from the airflow stream dropping under gravity influence to particulate exit 47. Exit 47 from separator arrangement 33 is generally aligned to provide gravity flow passage of the particulate material to the upstream side 5 of the air seal assembly 4.

For the arrangement described and shown in FIG. 1, air seal assembly 4 comprises a rotary air seal 50. A rotary air seal 50 is depicted in greater detail, in FIG. 2.

Figure 2:
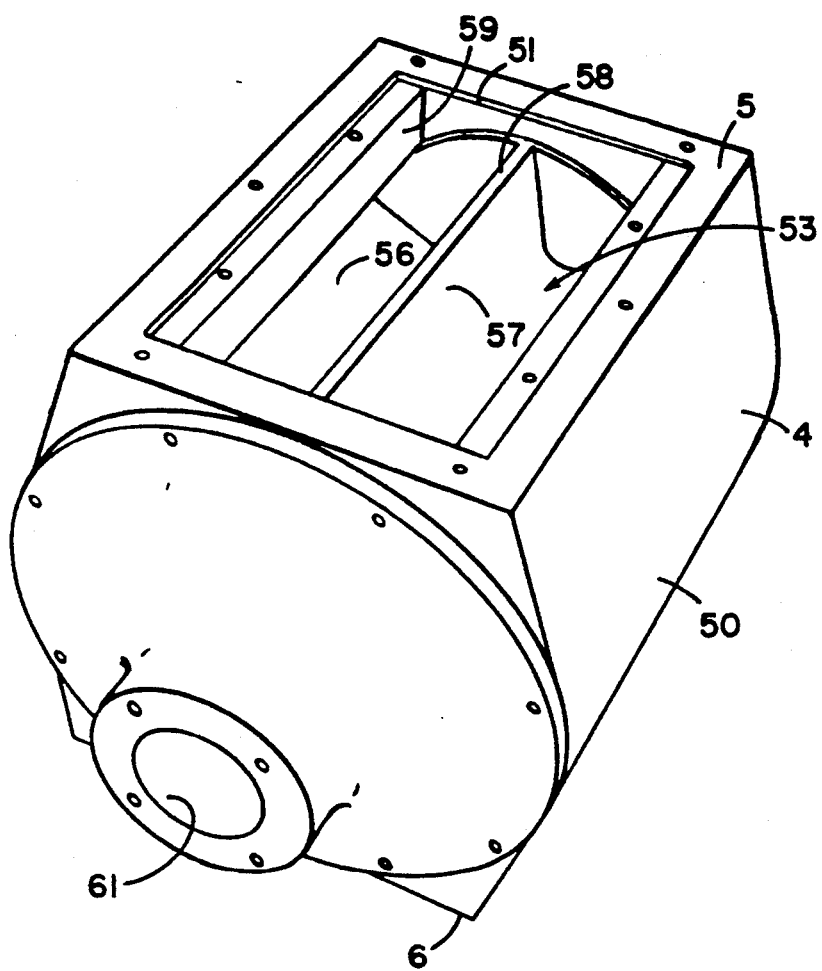
FIG. 2 is an enlarged, perspective view of an air seal arrangement used in the transfer system of FIG. 1.

Referring to FIG. 2, rotary air seal (airlock) 50 has an upstream side 5 and a downstream side 6. Upstream side 5 defines an entrance port 51, for receipt of particulate material from the separator arrangement 33. Inside of rotary air seal 50, a rotating multi-compartment vaned arrangement 53 is provided; in FIG. 2, compartments 56 and 57 being viewable. In operation, the vaned arrangement 53 is continuously rotated as a separation process in separator arrangement 33 is conducted. Particulate material, then, falls on a continuous basis into the compartments, such as compartments 56 and 57, as the vaned arrangement 53 rotates. On side 6, a port (not shown) similar to port 51 is provided. As the compartments rotate past the port in side 6, the particulate material is dumped from rotary seal 50. A pressure differential between sides 5 and 6 is provided by ensuring an appropriately snug fit between vanes 58 and housing 59. Herein, when it is said that means for maintaining an air pressure differential between the upstream and downstream side of the air seal assembly are included within systems according to the present descriptions, it is meant that such means is capable of providing enough differential for operation of the separator arrangement 33 under the reduced pressure conditions of the airflow stream. An extremely tight seal, it will be understood, is not required since in operation the blower arrangement 35 provides a substantially continuous draw. In general, what is required is sufficient maintenance of seal so that there is not a substantial flow of air upwardly through rotary air seal 50 as the system is operated, (other than air provided in compartments 56 and 57 when particulate material is dumped therefrom; i.e., air which displaces the contents of the compartments 56,57 as the assembly is rotated).

Referring to FIG. 1, the vaned arrangement 53 within rotary air seal 50 is automatically and continuously rotated by means of motor 60. While motor 60 is not illustrated in FIG. 2, it will be understood that it can communicate with the vaned arrangement 53 through access port 61.

Referring again to FIG. 1, means 15 for transporting particulate material from the downstream side 6 of air seal assembly 4 comprises transport arrangement 65. For the arrangement described and shown, transport arrangement 65 is a gravity transport arrangement. That is, particulate material is conveyed by transport arrangement 65 under the influence of gravity to the second container 24 (i.e. it flows downwardly). For the arrangement illustrated, transport arrangement 65 includes: a funnel 66 for receipt of particulate dropping through the bottom side 6 of air seal assembly 4; and conduit assembly 68, for directing particulate material from funnel 66 to a selected location. Conduit assembly 68 includes a telescoping tube construction 69 defining an internal solids flow passageway therein. An operator can adjust the length of telescoping tube assembly 69 to achieve a selected delivery of solids. In particular, telescoping tube arrangement 69 includes inlet end portion 70 for receipt of particulate material from air seal assembly 4, and outlet end portion 71 through which transported particulate material is selectively discharged.

For the embodiment illustrated in FIG. 1, transport arrangement 65, separator arrangement 33, and air seal assembly 4 are mounted on a pivotal base, so that telescoping tube arrangement 69 can be pivoted (about a substantially vertical axis) through an arc. Such an assembly would allow at least 2 degrees of freedom of motion for outlet end portion 71; a first provided by adjusting a length of the telescoping of tube arrangement 69; and, a second provided by the pivotal movement. A third can be provided by a flexible connection (hose) at elbow 72, FIGS. 1 and 3. Such a connection allows the operator to lift or drop end portion 71.

Figure 3:
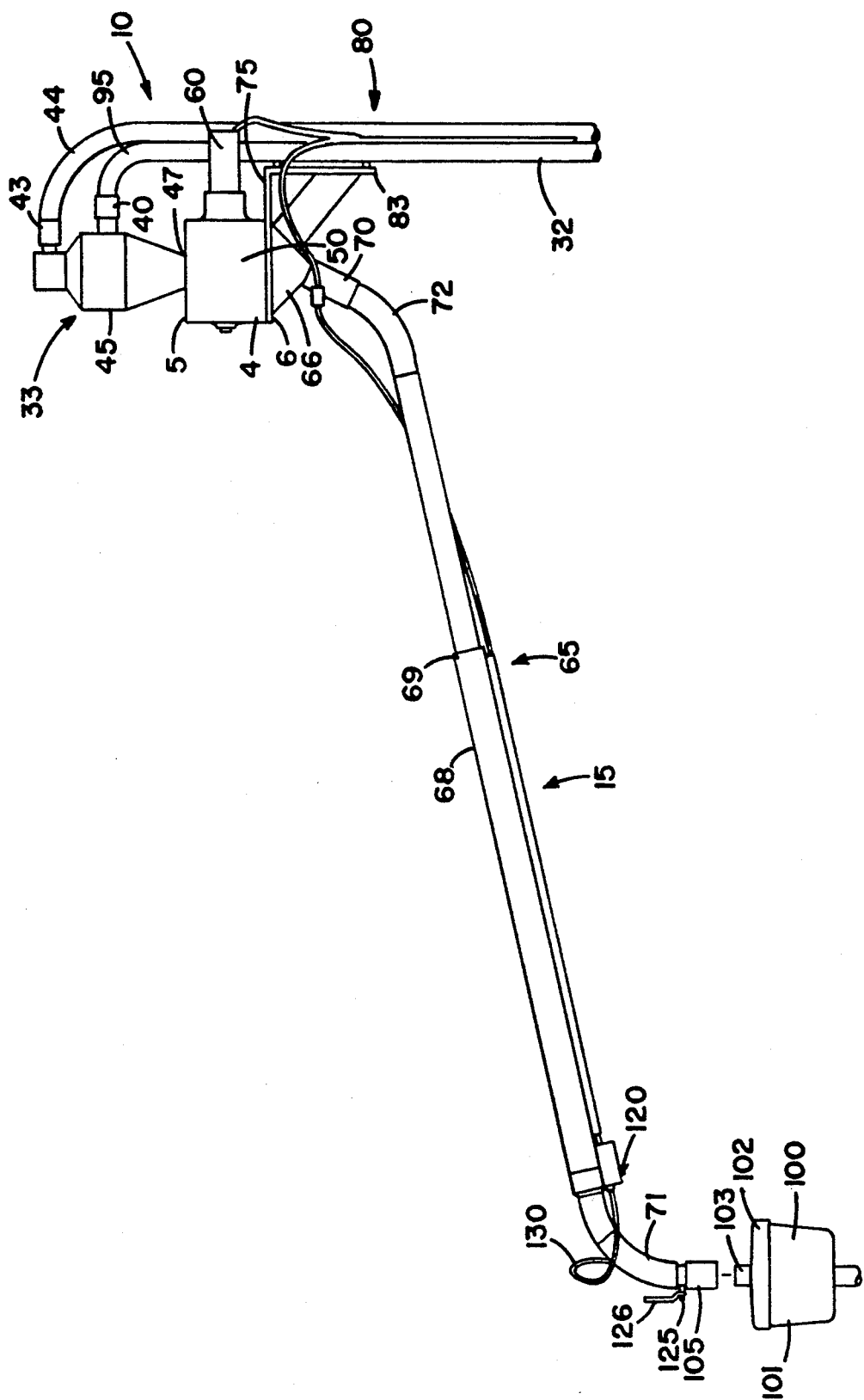
FIG. 3 is a fragmentary, elevational view of a portion of the transfer system depicted in FIG. 1.

For the arrangement illustrated in FIG. 1, transport arrangement 65, air seal assembly 4, and separator arrangement 33 are mounted on platform 75. Platform 75 is mounted on a two-sectioned tower 80, having an upper portion 83 radially rotatable relative to a lower portion 84. The platform 75 is mounted on the upper portion 83, and thus can pivot rotationally relative to the lower portion. With respect to this, attention is directed to FIG. 3. In FIG. 3 is an enlarged, fragmentary drawing illustrating platform 75, a portion of tower 80, air seal assembly 4, separator arrangement 33, and transport arrangement 65. In FIG. 3, only a portion of tower 80 is shown, and the portion shown is part of the upper section 83.

Figure 4:
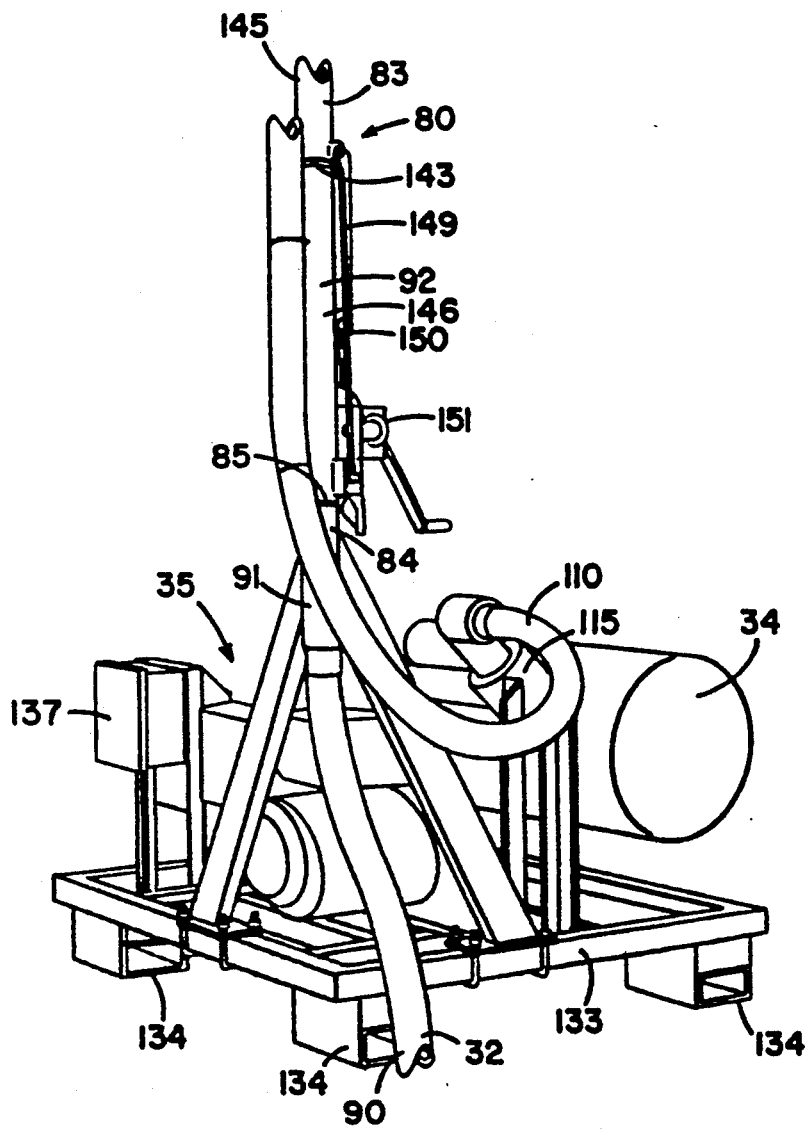
FIG. 4 is a fragmentary, perspective view of a portion of the transfer system depicted in FIG. 1.

Attention is now directed to FIG. 4. FIG. 4 is an enlarged, fragmentary perspective view of a portion of transfer system 1 illustrated in FIG. 1. The portion of system 1 depicted in FIG. 4 generally comprises part of tower 80, part of intake tube 32, filter arrangement 34, and blower assembly 35. The upper section 83 of tower 80 is illustrated. The bottom section of tower 80 is generally indicated at 84. A readily rotatable joint 85 is provided between sections 83 and 84. At joint 85, upper section 83 engages lower section 84 and is rotatable thereon. This can be provided in a variety of manners, including by having a portion of lower section 84 extend upwardly into upper section 83, or by providing a portion of upper section 83 extending downwardly into lower section 84. In general, all that is required is a secure but rotatable connection. This rotation is referred to herein as "radial" or "rotation about a common central axis".

Still referring to FIG. 4, for the preferred embodiment illustrated and described, a portion of intake tube 32 comprises flexible hose 90. Also, a portion of intake 32 comprises rigid sections 91 and 92. Rigid section 91 generally comprises an extension of pipe forming lower section 84 of tower 80. Rigid section 92 generally comprises the tube which formed upper section 83 of tower 80. Thus, for the arrangement shown, a portion of intake tube 32 comprises two rigid tube sections connected to one another in a manner allowing for rotation of one (preferably the upper one) relative to the other on a common axis.

Referring to FIG. 3, above rigid section 91, a section of flexible hose 95 is provided, to allow airflow communication with inlet 40.

Transfer systems 1 according to the present invention may be utilized to transfer particulate material to a closed container. Referring to FIG. 3, a closed storage receptacle is indicated generally at 100. Receptacle 100 may comprise the holding container 101 of a selected piece of farm equipment. Container 101 includes a cover 102 thereon. Cover 102 is provided with adapter 103. The outlet end portion 71 of transport arrangement 65 is provided with a mating adapter 105. Thus, adapter 105 can be connected to 103 to allow particulate flow through transport arrangement 65 into receptacle 101, without generation of significant amounts of airborne dust; i.e., the transfer is basically in a closed system. Sufficient displacement of air can take place, since particulate material is involved, to allow for free flow without significant problem.

The transfer in a basically closed system as described from air seal assembly 4 to receptacle 100 is highly advantageous, and is facilitated by the fact that transfer through transport arrangement 65, for selected arrangements, is conducted under gravity influence rather than positive or negative pressure, and is conducted under ambient air conditions or a pressure slightly less than ambient, i.e., it is not conducted in a rapidly moving airstream. Thus, dust is not likely to be generated in the open atmosphere near end portion 71. (The dust may be drawn back through the air seal and be recycled in the separator.)

In general, transfer system 1 as thus far described operates on a more or less "continuous" basis. That is, as long as there is particulate material in the first container 23 and as long as a vacuum draw is provided to intake tube 32, particulate material will be transported to separator arrangement 33, through air seal assembly 4, through transport arrangement 65 and outwardly through end portion 71. It is foreseen that a worker utilizing transfer assembly 1 may desire to stop flow with relatively precise control, intermittently. For example, it may be desired to stop flow at end portion 71 when end portion 71 is moved from one receiving receptacle to another receiving receptacle. A convenient manner for accomplishing this is by appropriate control of blower assembly 35. With respect to this, attention is directed to FIG. 4.

Referring to FIG. 4, airflow from intake tube 32 is directed into filter 34 through tube 110. Between tube 110 and filter 34, valve construction 115 is provided. Preferably valve construction 115 comprises a two-way valve, operated by a solenoid or the like. The two-way valve of valve construction 115 preferably has first and second orientations: the first orientation allowing draw of air through filter 34 only from tube 110; a second orientation closing tube 110 and allowing draw of air through filter arrangement 34 only from the ambient. Thus, when valve construction 115 is thrown to the first orientation, a suction on intake tube 32 is provided. However, when valve construction 115 is thrown to the second orientation, the draw on intake tube 32 from blower assembly stops, and ambient air is drawn through filter assembly 34 and exhausted by the blower assembly 35. Again, preferably valve construction 115 is operated by a solenoid. The solenoid may be controlled by remote switch 120, FIG. 3. Switch 120, it will be understood, is positioned where an operator handling end portion 71 can conveniently reach and control operation. Thus, by throwing switch 120 to the appropriate position, the operator can stop a draw of particulate material up to cyclone separator 33 (and in effect stop delivery of particulates to end portion 71).

Still referring to FIG. 3, in some instances particulate material may be retained within telescoping tube 69, even after feed to separator arrangement 33 is stopped. In order to inhibit leakage of the particulate material from tube 69 as the worker moves in portion 71 from a first receptacle to a second receptacle, a control valve 125 is provided in end portion 71. Generally, control valve 125 comprises a butterfly valve or similar valve controlled by handle 126. In use the operator can, by controlling the position of handle 126, close end portion 71 of telescoping tube 69, thus inhibiting leakage or spillage of particulate material therefrom. This will allow for convenient disconnect of adapter 105 from one receptacle, and connection to another receptacle.

It is foreseen that in some instances, means for automatically detecting an amount of material discharged from end portion 71 will be useful. For the embodiment illustrated and described, the detection means detects the amount of material which is transferred out of tube arrangement 75, by detecting when the second receptacle 100 is filled a selected amount. Thus, it does not provide a quantitative volume measurement, but rather detects a level of material in receptacle 100 as it is filled.

More specifically, a fiber optic sensor arrangement 130 is provided. Fiber optic sensor arrangement 130 terminates within end portion 71, generally at or near the end of adapter 105. The fiber optic can detect when receptacle 100 is nearly filled. In certain selected constructions, the fiber optic, which comprises detection means for detecting an amount of flowable material discharged from the telescoping tube assembly outer end portion 71, is associated with means for stopping the flow of flowable solids up to the separator 33. Preferably, the fiber optic arrangement 130 comprises means for providing an automatic signal to throw valve assembly 115 into the second configuration previously described. That is, fiber optic assembly 130 comprises an automatic override which operates analogously to manual switch 120. Thus, fiber optic assembly 130 can be utilized to automatically control the discharge of material from end portion 71 into receptacles such as receptacle 100.

Referring to FIG. 4, preferably transfer system 1 is provided with a base frame 133 on which the remainder of the transfer system 1 is mounted. The base frame 133 depicted has, on an underside thereof, a plurality of guides 134. The guides 134 are appropriately positioned for receiving the forks or tines of a forklift jack, for easy moving of transfer system 1. Thus, the transfer system 1 can be easily mounted on a truck, FIG. 1, or dismounted therefrom. It will be understood that base frame 133 further includes appropriate means, not detailed, for supporting the remainder of the transfer system including, inter alia, filter arrangement 34; blower, arrangement 35 comprising an engine and a blower; and the tower. Still referring to FIG. 4, transfer system 1 is provided with control box 137 thereon for controlling various means associated with the system 1. Control box 137 may include, for example, switches and controls for the engine, the blower, a battery positioned on the arrangement (not shown) or similar constructions.

Referring again to FIG. 1, it is foreseen that in some applications it may be desirable to provide transfer system 1 with a jointed tower 80. In this manner, the arrangement could be readily collapsed to a configuration having a less extensive vertical extension. An arrangement for doing this is provided, as illustrated in FIG. 4.

Referring to FIG. 4, tower 80 is generally jointed at 143 between an upper segment 145 and a lower segment 146. Upper segment or section 145 is attached to lower segment or section 146 by a hinge, not shown. When positioned in an upright position, lock arrangement 149 attaches hook 150 in extension between the two sections 145 and 146, to provide for secure engagement. When hook 150 is disattached from upper section 145, the upper section 145 can be pivoted about the hinge, to swing downwardly. Assistance to movement of upper section 145 about the hinge, is provided by winch arrangement 151. Thus, in the field, transfer system 1 can be readily set up by controlling winch 151 to raise upper section 145, and then by appropriate engagement of lock arrangement 149. In general, lock arrangement 149, including hook 150 and winch 151, are mounted on upper section 83, FIG. 4. Thus, they can rotate with section 83 relative to section 84.

Referring again to FIG. 1, as previously described, vacuum adapter 38 is provided at inlet end 155 of intake tube 32. A preferred vacuum adapter 160 for certain applications is illustrated in FIG. 5.

Figure 5:
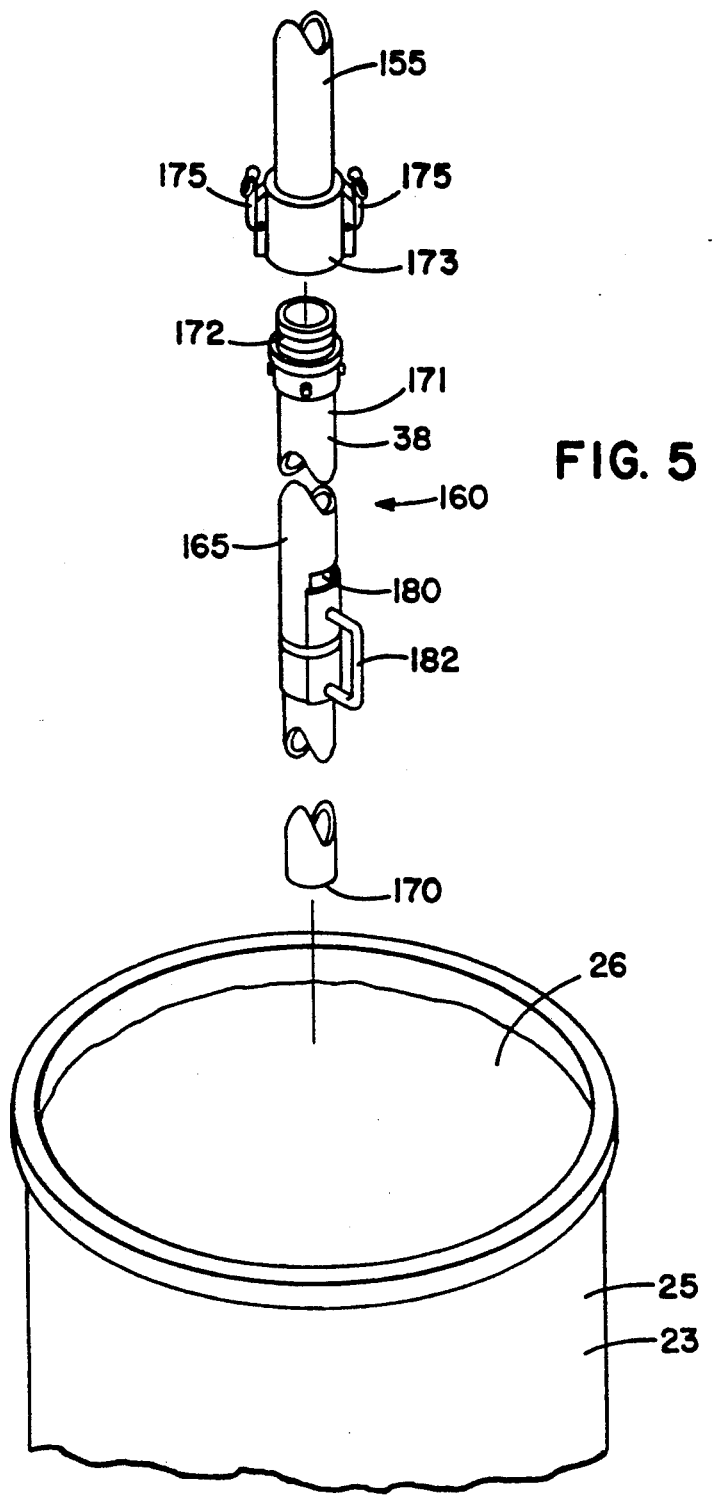
FIG. 5 is an enlarged, exploded, fragmentary, perspective view of a vacuum adapter usable with the transfer system of FIG. 1.

Referring to FIG. 5, vacuum adapter 160 is depicted in an exploded perspective view. Inlet end 155 of intake tube 32 is illustrated, exploded from vacuum adapter 160. Adapter 160 is shown exploded from container 23 and particulate material 26.

Vacuum adapter 160 comprises hollow tube 165 having an inlet end 170 and an outlet end 171. At outlet end 171 an adapter 172 is provided for quick connect to an adapter 173 provided at inlet end 155 of intake tube 32. Secure connection can be provided by an adapter 173 having lock control 175 thereon. A conventional adapter 173 may be utilized.

For the preferred embodiment, tube 165 includes air bleed aperture 180 therein. In use, end 170 of tube 165 is inserted into particulate material 26 with air bleed 180 exposed above an upper surface of particulate material 26. When transfer system 1 is operated to provide a vacuum draw in vacuum adapter 160, air will be pulled through aperture 180 into tube 165 and upwardly through intake tube 32. The vacuum draw provided by this flow of air will pull particulate material 26 upwardly through vacuum adapter 160 and intake tube 32 also. A sliding gate arrangement 182 can be utilized to control the size of air bleed 180.

A locking adapter similar to adapter 173 can be utilized to provide locking engagement between adapter 105 and adapter 103, FIG. 3. Also, an adapter analogous to vacuum adapter 160 can be utilized to draw particulate material out of a variety of containers including flexible sacks or bags. Of course, a variety of configurations for adapter 160 can be used.

Figure 6:
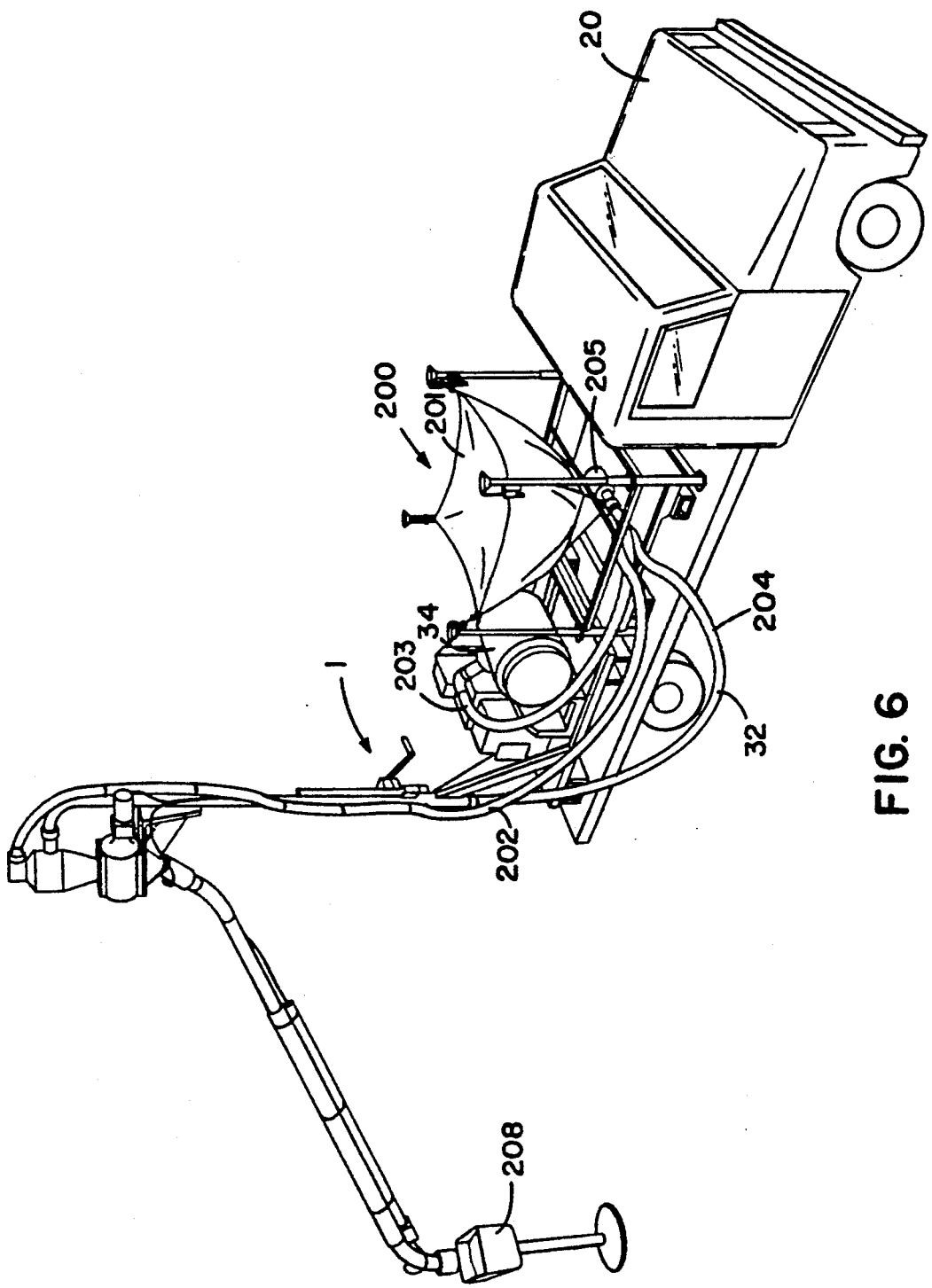
FIG. 6 is a perspective view of a transfer system according to the disclosure of Ser. No. 07/850,564 depicted in association with a flexible storage container.

Attention is now directed to FIG. 6. In FIG. 6 a transfer system 1 generally is described as shown positioned on a truck 20. The truck 20 also includes thereon a carrier assembly 200. The carrier assembly includes a large, flexible, collapsible storage container 201 containing particulate material therein. Air intake line 32 is directly connected to an outlet from container 201, to draw particulate material therefrom. Hoses 202 and 203 allow for air transfer through an air filter arrangement 205 mounted in carrier assembly 200, before the air is transferred through air filter assembly 34. Thus, in operation, transfer system 1 is utilized to draw particulate material from carrier assembly 200 and to transfer same to holder 208. When carrier assembly 200 is emptied, it can be removed from truck 20 and replaced with another carrier assembly. FIG. 6 illustrates that the transfer systems 1 according to the present invention may be utilized to conduct what is essentially a completely "closed" transfer, i.e., from closed container 201 to another closed container. Thus, dust can be held to a minimum.

Transfer systems as described may be utilized for conveyance of a variety of materials. Thus, they may: be constructed of various materials; be provided with various engine and blower systems; and, be provided with a variety of sizes, shapes, etc. of hoses, conduits, and framework. They may be utilized to transfer relatively small particles, for example on the order of 7–8 million population per pound, or relatively large particulate materials. Arrangements usable to transfer herbicides, pesticides and seed material from large storage containers into the holder of farm equipment can be powered with a variety of positive displacement blowers, for example ones capable of displacing about 100–150 cubic feet per minute, i.e., capable of producing a pressure differential up to about 15 inches of mercury. In general, such an arrangement will be capable of transferring about 100–200 pounds per minute of material, through a line size of about 2 inches diameter. A variety of engine/generator systems may be utilized to control such arrangements. These can include internal combustion engines positioned on base frame 133. In the alternative, power takeoffs from farm equipment or remote generators may be utilized.

DETAILED DESCRIPTION OF FIGS. 7–11

As indicated above, FIGS. 1–6 present the disclosure of U.S. Ser. No. 07/850,564, from which the present disclosure claims priority. FIGS. 7–11 depict an improved transfer system according to the present invention. As will be apparent from the following description, in many ways the arrangement of FIGS. 7–11 operates analogously to the arrangements shown in FIGS. 1–6. The principal difference concerns the type of mechanism upon which the arrangement is mounted, for operation. The arrangements of FIGS. 1–6 concern a tower-like arrangement, with a rather extended vertical reach. This called for a long, downward, gravity flow from the separator arrangement, through a telescoping tube arrangement. As will be apparent from the following descriptions, the arrangement of FIGS. 7–11 concerns a mounting of the air seal and separator arrangement on an elongate articulated arm, for extended horizontal reach. As a result, the vertical drop or gravity feed (discharge from the air seal arrangement) can be through a rather short distance.

Figure 7:
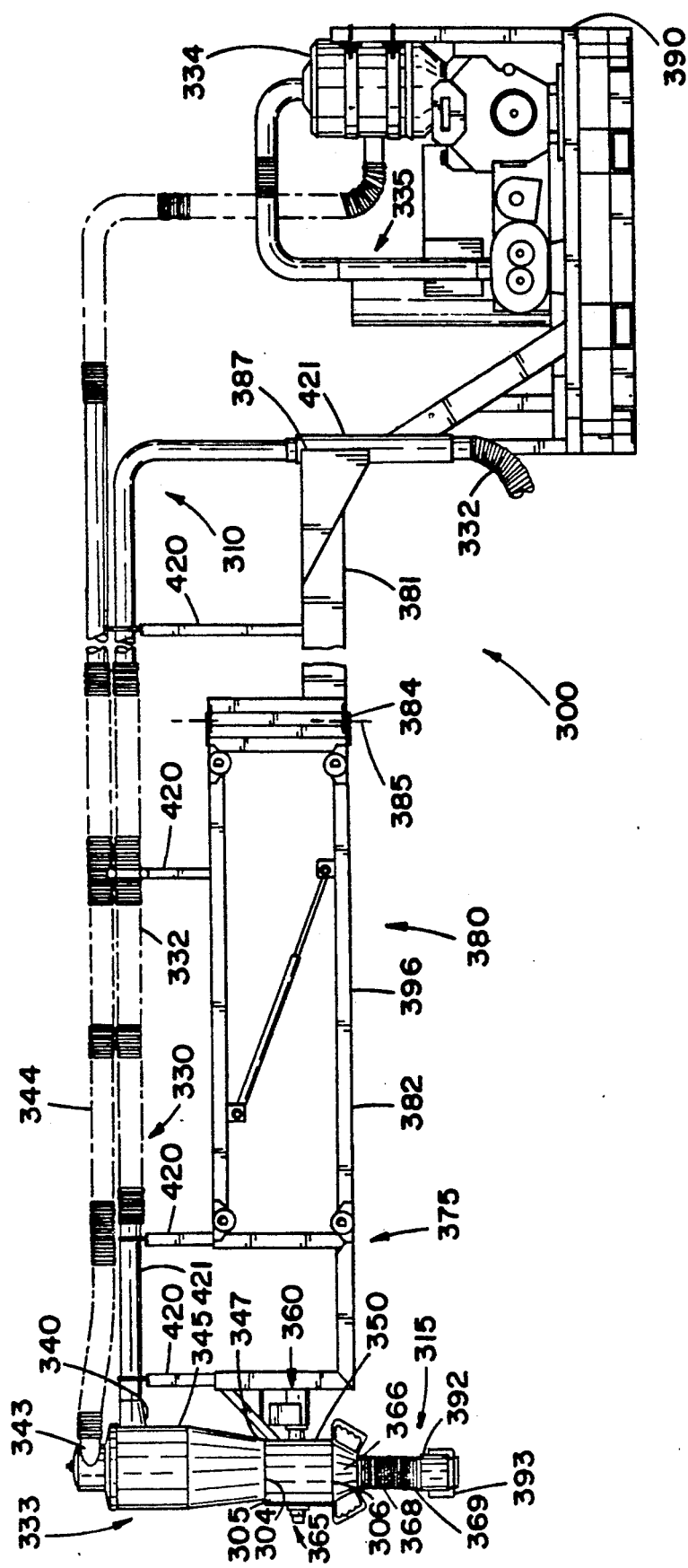
FIG. 7 is a side elevational view of a transfer system according to the present invention.

Reference numeral 300, FIG. 7, generally indicates a transfer system for moving flowable solids, according to the present disclosure. As with the systems of FIGS. 1–6, the transfer system 300 includes an air seal (airlock) assembly 304. The air seal assembly 304 has an upstream side 305 and a downstream side 306. The air seal assembly 304 includes means for maintaining air pressure differential between the upstream and downstream sides, even as flowable solid material is passed therebetween.

Transfer system 300 also includes means for transporting flowable solid material to the upstream side 305 of the air seal assembly 304. This is generally indicated at reference numeral 310. The system 300 further includes means for transporting flowable solid material from the downstream side 306 of the air seal assembly 304 to a selected location. This is generally indicated by reference numeral 315.

Still referring to FIG. 7, preferred means 310 for transporting flowable solid material to the upstream side 305 of the air seal assembly 304 generally comprises a transport arrangement 330. For the embodiment shown, a transport arrangement 330 is constructed and arranged to deliver particulate material to the upstream side 305 of air seal assembly 304 in an air flow stream having a pressure of less than ambient. Transport arrangement 330 comprises intake tube 332, separator arrangement 333, filter arrangement 334 and blower assembly 335. As with the arrangements of FIGS. 1–6, operation is generally as follows:

Particulates are drawn into intake tube 332 through an end thereof, not shown, in a manner analogous to that shown with respect to FIGS. 1–5 (vacuum adaptor 160). The particulates (carried by an airstream) travel through tube 332 up to inlet 340 of separator arrangement 333. In separator arrangement 333, the particulates are separated from the airflow stream. The airflow stream is drawn off from separator arrangement 333 through outlet 343. The air stream then passes through outlet tube arrangement 344 to filter assembly 334, whereat fine contaminants are removed from the airflow stream, before the air passes through blower assembly 335 and is vented to the atmosphere. The blower assembly 335 generally comprises a blower which: draws air from the ambient (i.e. creates a vacuum draw on intake tube 332); pulls the air through filter arrangement 334 and blows (discharges or exhausts) the air into the environment. The blower assembly 335 may comprise a conventional engine/blower system, or any of a variety of alternative systems.

As with the arrangement shown in FIGS. 1–6, the airflow stream inside of intake tube 332 is at a pressure less than ambient, while it is carrying the particulate material to the separator 333. Thus, should a break or puncture form in line 332, generally due to the negative pressure relative to the environment, air from the environment would flow into the puncture from outside (as opposed to flow particulate material outwardly from the puncture).

For the embodiment illustrated in FIG. 7, as with the arrangements of FIGS. 1–6, separator arrangement 333 comprises a cyclone separator 345. Particulate material continuously separator from the airflow stream by cyclone separator 345, drops under gravity influence to particulate exit 347. Exit 347 from separator arrangement 333 is generally aligned to provide gravity flow passage to the particulate material to the upstream side 305 of the air seal assembly 304.

For the arrangement described and shown in FIG. 7, air seal assembly 304 comprises a rotary air seal (airlock) 350, analogously to the arrangement shown in FIGS. 1 and 2.

Referring to FIG. 7, rotary air seal 350 is automatically and continuously controlled by hydraulic control arrangement 360. Thus, it is controlled differently from the arrangement shown in FIGS. 1 and 2, which utilized an electric motor. However, electric motors and the like could be utilized.

Referring again to FIG. 7, means 315 for transporting particulate material from the downstream side 306 of air seal assembly 304 comprises transport arrangement 365. The particular transport arrangement 365 depicted is a gravity transport arrangement. That is, particulate material is conveyed by transport arrangement 365 under the influence of gravity. Transport arrangement 365 includes: a funnel 366 for receipt of particulate dropping through the bottom side 306 of air seal assembly 304; and, conduit 368, for directing particulate material from funnel 366 to a selected location. Conduit 368 comprises a flexible tube 369 defining an internal solids flow pas sage way. For the arrangement shown in FIG. 7, tube 369 is a relatively short extension (0.25–0.5 meter) of tubing. It is not a telescoping arrangement as utilized in FIGS. 1–6, for reasons described below.

For the arrangement illustrated in FIG. 7, transport arrangement 365, separator arrangement 333, and air seal assembly 304 are mounted on an articulated construction, so that tube 369 can be selectively pivoted. In particular, transport arrangement 365, air seal assembly 304 and separator arrangement 333 are mounted on support frame 375. Support frame 375 is mounted on articulated arm arrangement 380. Articulated arm arrangement comprises first extension 381 and second extension 382. First and second extensions 381 and 382 are pivotally connected to one another at pivot 384 for articulation about (vertical) axis 385. First extension 381 is also pivotally mounted within arrangement 300 at (vertical) pivot 387. Pivotal movement of the articulated arm arrangement 380 will be further described below, with reference to FIGS. 9 and 10.

Still referring to FIG. 7, arrangement 300 includes a support platform or base frame 390 on which articulated arm arrangement 380 is mounted. In addition, base frame 390 carries various blower, filter and engine assemblies for operation of arrangement 300. Base frame 390 may be generally analogous to the base frame arrangement described with respect to FIGS. 1–6, if desired.

Still referring to FIG. 7, the second extension 382 of articulated arm arrangement 380 is adapted to permit selected (vertical) movement of separator arrangement 333, air seal assembly 304 and transport arrangement 365. Thus, end 392 of tube 369, with coupler 393 thereon, can be moved up and down, as selected by an operator, to obtain connection with various arrangements such as planter arrangements, into which particulate material may be dispensed from separator arrangement 333. For the arrangement depicted in FIGS. 7–11, means providing for vertical motion of air seal assembly 304, separator arrangement 333 and transport arrangement 365 comprise a parallelogram linkage system 396. Parallelogram linkage system 396 comprises a portion of extension 382.

Referring to FIG. 8, parallelogram linkage system 396 comprises first and second (vertical) end links 398 and 399, respectively, having upper and lower cross-extensions 400 and 401, respectively, extending therebetween. Upper extension 400 is pivotally mounted to each end link 398 and 399 as indicated at (horizontal) pivots 403 and 404 respectively. In general, connection is such as to allow for pivoting around a substantially horizontal axis through each of pivots 403 and 404. Similarly, lower extension 401 is pivotally connected to first and second end links 398 and 399 respectively, at pivots 405 and 406 respectively. Again, pivots 405 and 406 operate to allow pivoting of lower extension 401, analogously to extension 400, about substantially horizontal pivot axes.

Pivotal movements at pivots 403, 404, 405 and 406 will be generally understood by comparison of FIGS. 7 and 8, and by comparison of the phantom lines in FIG. 8 to the solid lines therein.

The arrangement defined by first and second end links 398 and 399, extensions 400 and 401, and pivots 403, 404, 405 and 406 are generally referred to herein as parallelogram linkage system 396. A reason for this is that as end link 399 is moved up or down, the link arrangement defined by these members operates with opposite members maintaining extension generally parallel to one another.

The parallelogram linkage system 396 depicted includes a motion dampener, such as nitrogen gas-filled spring-loaded shock absorber 409, extending between extensions 400 and 401. Gas spring absorber 409 will operate to exert sufficient extension force to essentially balance elements within the assembly as well as to resist contraction sufficiently, to provide some resistance to vertical movement of link 399. Also, resistance provided by resistance pads in pivots 403, 404, 405 and 406 should be adjusted to be sufficient so that parallelogram linkage system 396 will remain generally stationary at any angle set by a worker, and also be of a resistance readily overcome by an average worker's strength, so that the worker can readily reset the vertical position of the parallelogram linkage system 396 (or transport means 315). Gas springs useable as spring 409 include commercially available gas springs such as model 14-20-45-28-B-B-560 available from Industrial Gas Springs, Inc. of Exton, Pa., 19341.

Still referring to FIG. 8, it will be apparent that at least portions of intake tube 332 and outlet tube arrangement 344 should comprise generally flexible tubing, to accommodate the changes and angle at parallelogram linkage system 396 as raised and lowered.

Also still referring to FIG. 8, a preferred construction for support frame 375 will be understood. Support frame 375 includes lower horizontal frame member 413, upright frame member 414 and support elements 415. Support elements 415 operate to connect elements such as the cyclone separator 345 to the upright support frame member 414. The support frame 375 is attached to the parallelogram linkage system 396 by frame member 413.

Figure 8:
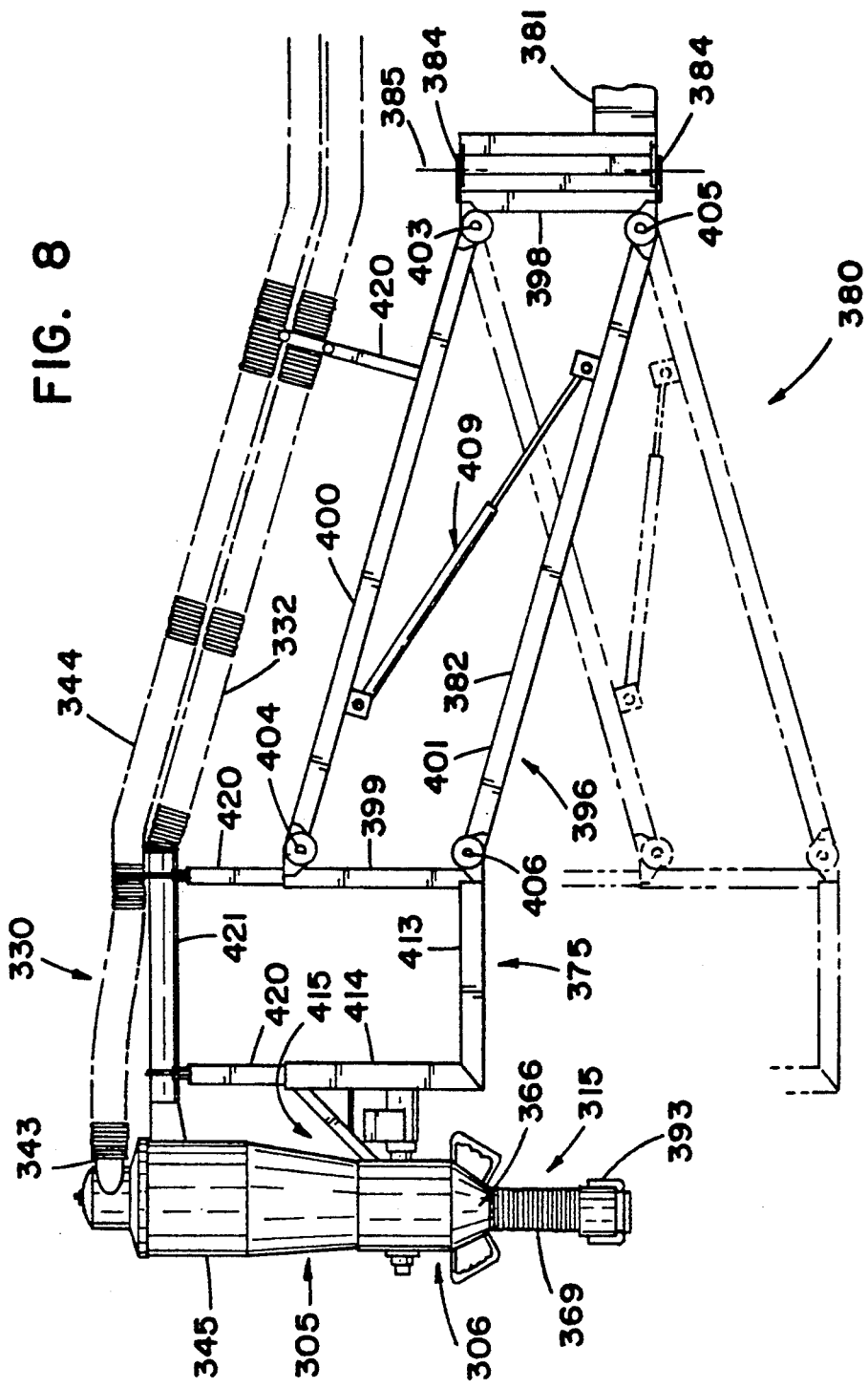
FIG. 8 is a fragmentary view of the arrangement shown in FIG. 7 depicted with a support arm thereof shown in an elevated position; a descended position for the support arm being depicted in phantom lines.

Referring to FIGS. 7 and 8, transfer system 300 includes support posts 420 thereon, for support of intake tube 332, and outlet tube 344 at spaced portions therealong.

It is noted that intake tube 332 need not be flexible along its entire length. For example, sections of tube 332 as indicated at 421 may comprise rigid tubing, since they extend through portions not required to flex during movement of parallelogram linkage system 396, or other movement of the articulated arm arrangement 380.

Still referring to FIG. 8, and as indicated above with respect to the description of FIG. 7, parallelogram linkage system 396 is part of an articulated arm arrangement 380, in particular it comprises second arm extension 382. More specifically, it is pivotally mounted upon first extension 381, at pivot 384, for pivoting around axis 385. Articulation of extension 382 relative to extension 381 will be better understood by reference to FIG. 9.

Figure 9:
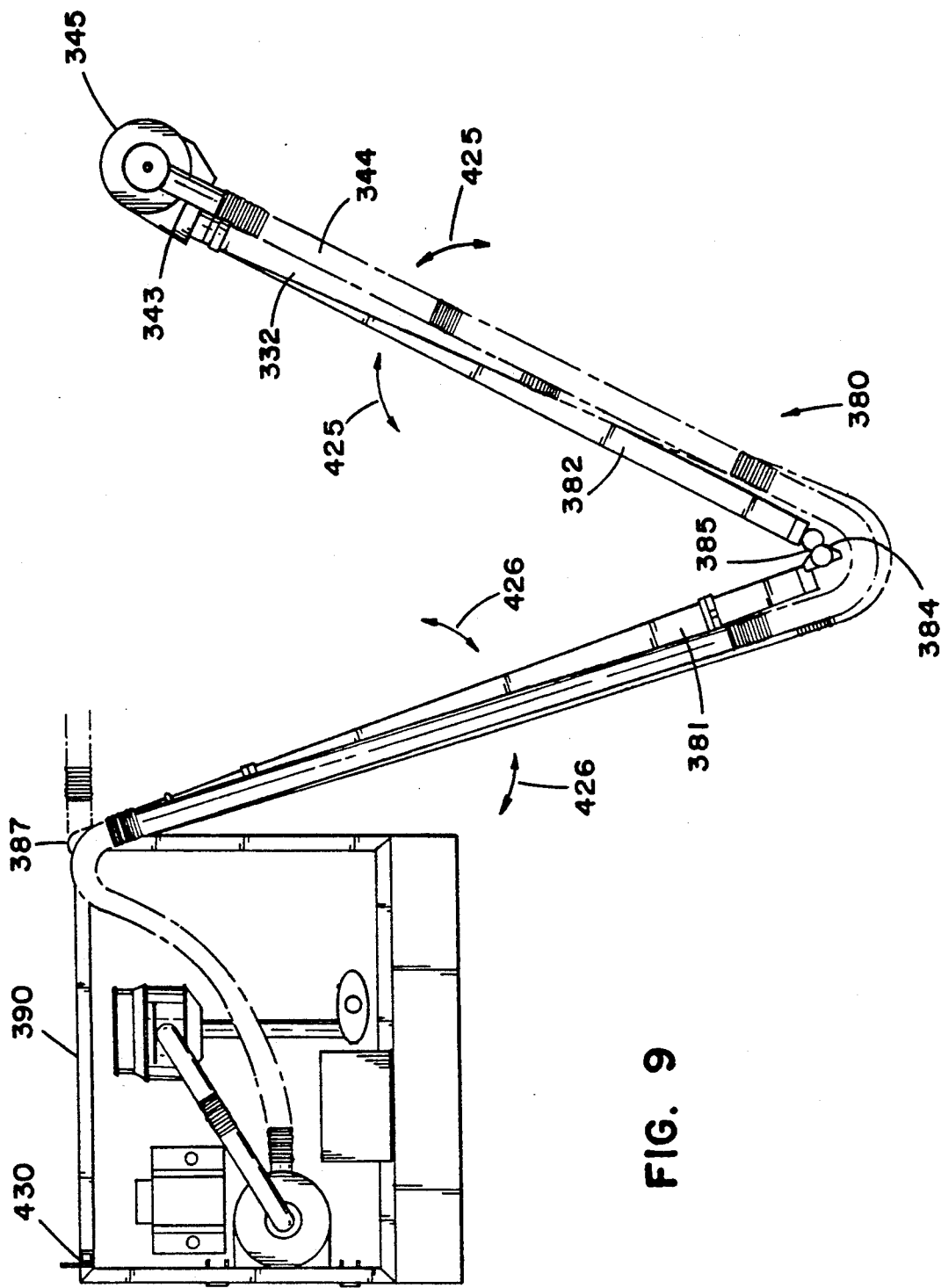
FIG. 9 is a top plan view of the system shown in FIG. 7, with a support arm thereof shown in an alternate orientation.

Referring to FIG. 9, the arrangement of FIGS. 7 and 8 is shown in top plan view; FIG. 9 being partially schematic. Articulated arm arrangement 380, comprising extensions 381 and 382, is shown mounted on base frame or platform 390. Pivotal engagement at pivots 384, between extension 382 and extension 381, permits pivoting around axis 385, in the general directions of arrows 425. Thus, cyclone separator 345, and outlet arrangements associated therewith, can be readily moved not only up and down through the operation of the parallelogram linkage system, but also laterally in space by pivoting of extension 382 about pivots 384.

In addition, extension 381 is pivotally mounted on platform base 390, at vertical pivot 387. This was described above. As a result, first extension 381 can be readily pivoted about vertical pivot 387, in the general direction as indicated by arrows 426.

It will be understood that in general the vertical movement allowed by parallelogram linkage system 396, and the pivoting movements permitted by pivots 384 and 387, in the articulated arm arrangement 380, provide the worker with a great deal of flexibility for positioning outlet means 315, and especially tube 369, FIGS. 7 and 8. Tube 369, and coupler 393 can thus be readily manipulated by a worker to move discharge of particulate material from separator arrangement 345 into alignment with various receptacle position around or near the platform base frame 390.

Figure 10:
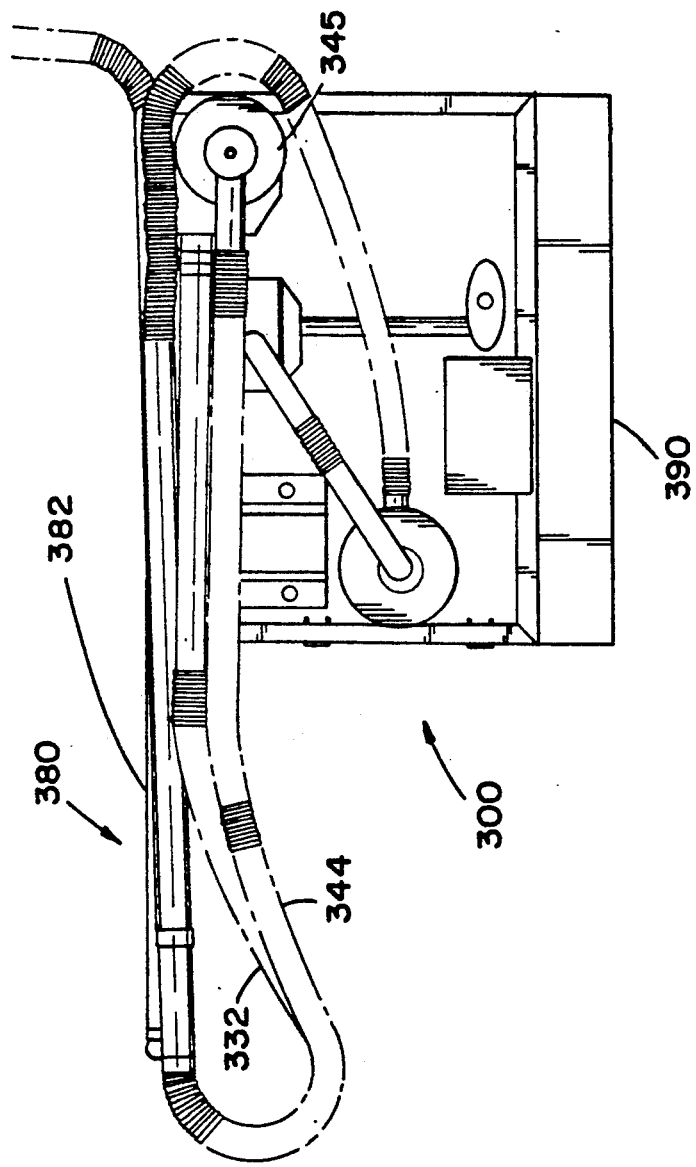
FIG. 10 is a top plan view of the arrangement shown in FIG. 9, with a support arm shown in a collapsed or storage position.

Attention is directed to FIG. 10. FIG. 10 is a top plan view generally analogous to FIG. 9. In FIG. 10 the articulated arm arrangement 380 is shown pivoted to a storage position. This allows for easy transport of the transfer system 300, for example on a truck or the like. To facilitate this, a lockage system is provided to lock the articulated arm arrangement 380 in a storage position, for security and safety.

Referring to FIG. 9, at 430 an upright post is indicated. Post 430 is utilized for locking. For example, a magnetic locking mechanism, providing for magnetic attraction between extension 381 and post 430, can be used to secure extension 381 when collapsed (folded) for storage. An alternate mechanical lock is depicted in FIG. 11.

Figure 11:
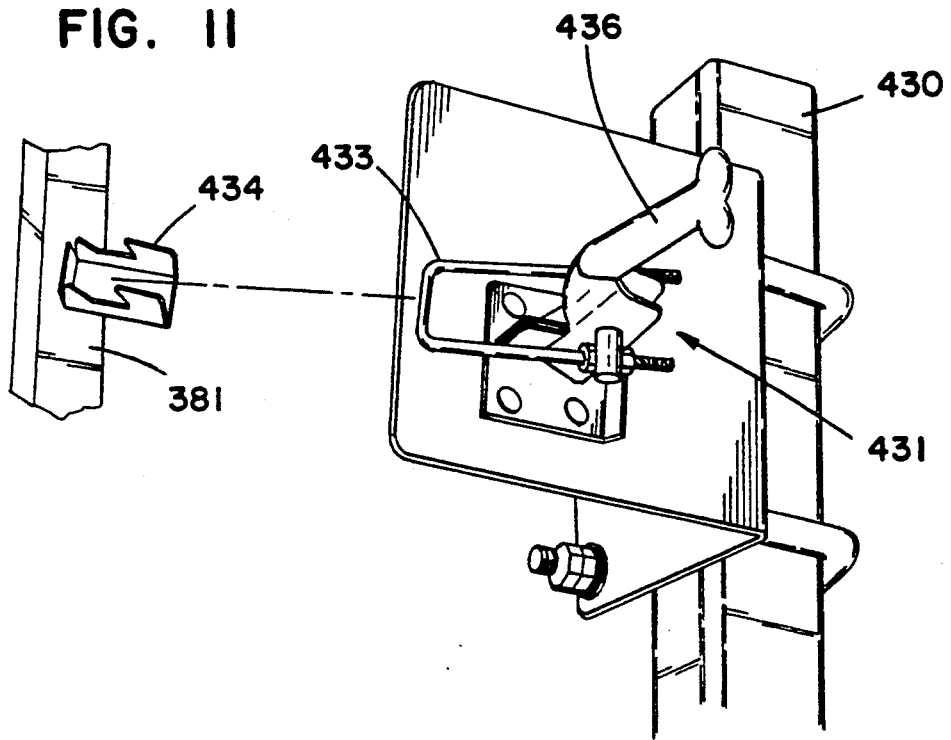
FIG. 11 is an enlarged fragmentary perspective view of a locking system for the support arm illustrated in FIGS. 9 and 10.

Referring to FIG. 11, upright post 430 is provided with a latch mechanism 431 thereon. The latch mechanism 431 includes a locking loop 433 constructed and arranged for selective engagement with a catch 434 secured to extension 381. Referring to FIGS. 9 and 10, when extension 381 is pivoted about vertical pivot 387 sufficiently so that extension 381 comes into proximity of post 430, latch mechanism 431 may be selectively operated to engage loop 433 over catch 434. Handle 436 can then be locked into an appropriate position to maintain engagement.

It is foreseen that a variety of materials may be utilized to construct arrangements according to the embodiments of FIGS. 7-11. Conventional materials may be utilized. It is foreseen that flexible plastic tubing will be convenient for the conveying tubes. Generally a diameter on the order of about 2"-4" will be convenient.

It is foreseen that steel members will be utilized, in typical embodiments, for the load bearing members of the articulated arm arrangement 380 and support arrangement 375. Conventional blowers, engines, clutch mechanisms, filter arrangements and control mechanisms may be utilized for various components in the engine and blower assembly. Conventional separators and air seal arrangements may also be utilized.

It is foreseen that for a typical embodiment for utilization with farm equipment, an arrangement wherein each of the first extension 381 and second extension 382 have a length of about 8-9 feet or so will be convenient. This would allow total length of extension of about 17 feet, and thus a working reach of about 34 feet (17 feet in each of two directly opposite directions). With such an arrangement one can readily use the transfer system 300 to load each of the receptacles in a 12 row planter or spreader.

It is foreseen that with the freedom of movement provided by the articulated arm arrangement, including the parallelogram linkage system, arrangements according to the present invention can be operated with a relatively short extension of tubing, as the outlet tube 369. In fact, all that is needed is about a 3-6" extension of tubing at this location. This will be convenient for the worker, and generally facilitates operation.

What is claimed is:

1. A transfer system for moving flowable solids, said transfer system comprising:
   (a) a support structure including a base frame and an articulated arm arrangement;
      (i) said articulated arm arrangement including a first arm extension and a second extension; said first extension being pivotally mounted on said base frame for selective pivotal motion with respect thereto; said second arm extension being pivotally mounted on said first extension for selective pivotal motion with respect thereto;
   (b) an air seal assembly supported on said second arm extension for pivotal movement therewith; said air seal assembly having an upstream side and a downstream side; said air seal assembly including:
      (i) means for maintaining an air pressure differential between said upstream and downstream sides of said air seal assembly; and
      (ii) means for transporting flowable solid material from said upstream side to said downstream side of said air seal assembly while maintaining an air pressure differential between said upstream and downstream sides of said air seal assembly; and,
   (c) means for transporting flowable solid material to said upstream side of said air seal assembly while conveying the solid flowable material within an airflow stream having an air pressure less than ambient.

2. A transfer system according to claim 1 wherein:
(a) said second arm extension comprises a parallelogram linkage arrangement constructed and arranged for selective vertical movement of said air seal assembly.

3. A transfer system according to claim 2 including means for transporting flowable solid material from said downstream side of said air seal assembly to a selected location, under ambient air pressure.

4. A transfer system according to claim 2 wherein said air seal assembly comprises a rotary air seal assembly.

5. A transfer system according to claim 2
(a) said means for transporting flowable solid material to said upstream side of said air seal assembly comprises a vacuum and separator construction including:
  (i) means for selectively collecting flowable solids material into a moving airstream and transporting same; and,
  (ii) means for selectively and continuously separating transported solids particulate material from the moving airstream and depositing the separated solids particulate material at said air seal assembly upstream side.

6. A transfer system according to claim 5 wherein said means for selectively and continuously separating transported solids particulate material from the moving airstream and depositing the separated solids particulate material at said air seal assembly upstream side comprises a cyclone separator arrangement mounted on said parallelogram linkage arrangement for selective vertical movement with said air seal assembly.

7. A transfer system according to claim 6 wherein:
(a) said means for transporting flowable solid material to said upstream side of said air seal assembly while conveying said flowable solids within an airflow having an air pressure less than ambient includes a vacuum tube arrangement defining an internal flow passageway and having a first end portion and a second end portion;
  (i) said vacuum tube arrangement second end portion being constructed and arranged to discharge an airflow stream having solid particulate material carried therein into said cyclone separator arrangement; and,
  (ii) said vacuum tube arrangement first end portion being constructed and arranged to selectively collect flowable solids material and selectively direct that flowable solids material into said vacuum tube arrangement internal flow passageway; and,
  (iii) wherein said means for transporting flowable solid material to said upstream side of said air seal assembly includes vacuum adaptor mounted on said vacuum tube arrangement first end portion, said vacuum adaptor comprising an elongate rigid tubular member having an air bleed arrangement therein.

8. A transfer system according to claim 6 wherein said means for transporting flowable solid material to said upstream side of said air seal assembly while conveying said flowable solids within an airflow having an air pressure less than ambient includes a vacuum tube arrangement at least a portion of said vacuum tube arrangement comprising a flexible hose.

* * * * *

UNITED STATES PATENT AND TRADEMARK OFFICE
CERTIFICATE OF CORRECTION

PATENT NO. : 5,322,098

DATED : June 21, 1994

INVENTOR(S) : Roy O. Christianson; Lee O. Christianson; Roland Rauenhorst

It is certified that error appears in the above-identified patent and that said Letters Patent is hereby corrected as shown below:

Column 1, line 51, after the word "expense", insert --.--.

Column 2, line 18, after the word "thereof", insert --.--.

Column 3, line 59, delete "is" and insert therefor --as--.

Column 3, lines 65 and 66, delete "constructing" and insert therefor --constructed--.

Column 4, line 48, delete "grander" and insert therefor --granular--.

Column 9, line 35, delete "in" and insert therefor --end--.

Column 13, line 8, delete "separator" and insert therefor --separated--.

Column 13, lines 35 and 36, delete "passage way" and insert therefor --passageway--.

Column 17, line 16, after the numeral "2", insert --wherein:--.

Signed and Sealed this

Twenty-sixth Day of March, 1996

Attest:

BRUCE LEHMAN

*Attesting Officer*      Commissioner of Patents and Trademarks